United States Patent [19]
Staab

[11] 3,755,875
[45] Sept. 4, 1973

[54] REAR CRANKSHAFT SEAL REMOVER
[76] Inventor: Marion F. Staab, Catherine Rt., Hays, Kans. 67601
[22] Filed: Dec. 1, 1970
[21] Appl. No.: 94,024

[52] U.S. Cl. .................................. 29/240, 254/131
[51] Int. Cl. ............................................. B23p 19/04
[58] Field of Search .................... 29/282, 233, 278, 29/235, 240, 280; 254/131, 120

[56] References Cited
UNITED STATES PATENTS
| | | | |
|---|---|---|---|
| 3,112,852 | 12/1963 | Norden et al. | 29/267 X |
| 1,736,585 | 11/1929 | Fehlhaber | 254/120 UX |
| 3,075,284 | 1/1963 | Salazar | 29/267 X |

*Primary Examiner*—Andrew R. Juhasz
*Assistant Examiner*—Leon Gilden

[57] ABSTRACT

This invention consists of a flat sheet metal handle having the configuration of a trapezoid when viewed from the front, and which has its smaller end terminating in circular ring sector that is adapted to be placed around that portion of the crankshaft that passes through the flywheel of an internal combustion engine. The wide end of the aforesaid handle is provided with a centrally located opening through which is placed a bolt that secures the handle to the just-mentioned flywheel. The tool is then used in the manner described later on in this specification.

4 Claims, 5 Drawing Figures

Patented Sept. 4, 1973
3,755,875
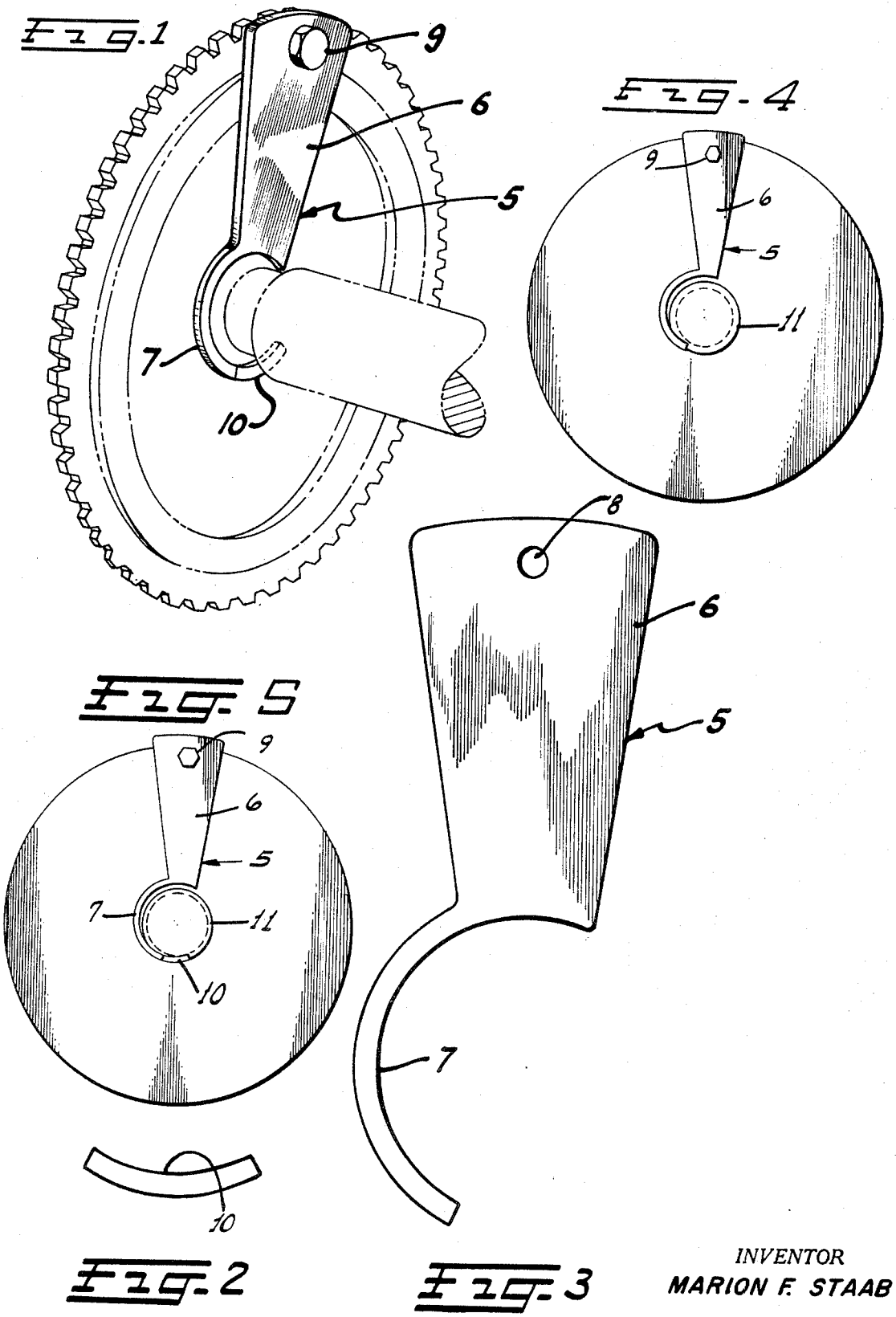

REAR CRANKSHAFT SEAL REMOVER

This invention relates to internal combustion engines; more particularly, to combustion tool known to those experienced in the internal combustion engines mechanics art as a rear crankshaft seal remover.

It is the principal object of this invention to provide a rear crankshaft seal remover that will remove the justmentioned seal with a minimum of effort and in a minimum of time.

Another object of this invention is to provide a rear crankshaft seal remover of the character herein described that is made of one piece of flat steel and is accompanied by a second piece of flat steel that has the configuration of a circular ring sector.

Still another object of this invention is to provide a rear crankshaft seal remover that takes up a minimum of space in the tool box of an automobile mechanic or the like.

Other and further objects of this novel invention will no doubt appear as the reading of this specification and its appended claims proceeds and the accompanying drawing is examined in connection therewith.

In the drawing:

FIG. 1 is a pictorial view of this invention, bolted to the gear of a flywheel of an internal combustion engine prior to the removal of the rear crankshaft seal. Only the actual invention is shown in solid black lines.

FIG. 2 is a front view of a detail of this invention.

FIG. 3 is a front view of the major portion of this invention.

FIG. 4 is a side view of a portion of the crank shaft and the fly wheel showing the major portion of the invention beginning to remove a seal 11.

FIG. 5, is a view similar to that of FIG. 4 showing both portions of the invention as used in the final stages of removing a seal 11.

In the several views of this invention, like parts of the invention are indicated by like reference numbers.

The reference number 5 indicates the major portion of this novel invention.

Directing ones attention first to FIG. 3 of the accompanying drawing it will be seen that the major portion of this invention consists of a handle 6 that is in the form of a flat piece of steel having the front configuration of a trapezoid. A circular ring sector 7 has one end integrally formed with the small end of the aforesaid handle 6. An opening 8 for the bolt 9 is located in the lateral center of the upper end of the aforesaid handle 6 of this invention which also embodies a separate piece of steel 10 that has the front configuration of a circular ring sector. This last-mentioned detail of this invention is illustrated in FIG. 2 of the drawing.

The way in which this novel invention is used is as follows:

All vehicles powered by internal combustion engines have an integrally threaded opening in the flywheel through which the aforesaid bolt 9 can be placed due to the fact that the clutch of the engine is secured to the opposite side of the just-mentioned flywheel. Therefore, all the mechanic needs to do is to place the aforesaid bolt 9 through the opening 8 in the upper end of the aforesaid handle 6, thus securing the handle to the flywheel. The flywheel is then rotated counterclockwise approximately one-fourth of a revolution, while pressing the end of circular ring section 7 against the seal 11 to permit said end to dig into the seal, as illustrated in FIG. 4, then the tension is released and the flywheel is reversed about one-fourth of a revolution. The mechanic then inserts the separate piece of curved steel 10 at the top of and joining the curved top of the tool as illustrated in FIG. 5, and then proceeds to turn the flywheel counterclockwise an additional one half revolution. The small piece of curved steel 10 will push out the seal and then the mechanic reverses the flywheel clockwise a distance of approximately one half of a revolution and the tool is free and of course the seal is removed.

This novel invention is subject to any and all changes and/or modifications that one may care to make in so long as the changes and/or modifications fall within the scope and intent of the appended claims.

What I now claim as new and desire to secure by Letters Patent is:

1. A rear crankshaft seal remover of the character described, comprising a single piece of steel having a handle which has one end adapted to fit around a crankshaft; and means of securing the said handle to the flywheel of an internal combustion engine of a vehicle; and a separate arcuate member to cooperate with said single piece of steel and being adapted to push the rear crankshaft seal out of place when the said flywheel is manually rotated.

2. The invention of claim 1, wherein the said handle has the configuration of a trapezoid having convexed upper end and a concaved lower end as well as a centrally located opening in the upper end for the reception of a bolt.

3. The invention of claim 2, wherein a circular ring sector that is made of steel has one end integrally formed with the lower end of the said handle.

4. The invention of claim 3, wherein the said means of securing the said handle to the flywheel of an internal combustion engine of a vehicle is by a bolt that is placed through the already-mentioned opening in the said handle and is then screwed into an internally-threaded opening in the side of the said flywheel.

* * * * *